(12) United States Patent
Ketelaer

(10) Patent No.: US 10,809,123 B2
(45) Date of Patent: Oct. 20, 2020

(54) DEVICE FOR GENERATING AN ULTRASONIC VIBRATION OF A TOOL AND FOR MEASURING VIBRATION PARAMETERS

(71) Applicant: SAUER GmbH, Stipshausen (DE)

(72) Inventor: Jens Ketelaer, Wiesbaden (DE)

(73) Assignee: SAUER GmbH, Stipshausen (DE)

( * ) Notice: Subject to any disclaimer, the term of this patent is extended or adjusted under 35 U.S.C. 154(b) by 87 days.

(21) Appl. No.: 15/742,440

(22) PCT Filed: Jul. 8, 2016

(86) PCT No.: PCT/EP2016/066330
§ 371 (c)(1),
(2) Date: Jan. 5, 2018

(87) PCT Pub. No.: WO2017/005917
PCT Pub. Date: Jan. 12, 2017

(65) Prior Publication Data
US 2018/0193925 A1    Jul. 12, 2018

(30) Foreign Application Priority Data
Jul. 8, 2015 (DE) .......................... 10 2015 212 810

(51) Int. Cl.
*G01H 11/08* (2006.01)
*B23B 37/00* (2006.01)
(Continued)

(52) U.S. Cl.
CPC ............. *G01H 11/08* (2013.01); *B23B 31/02* (2013.01); *B23B 31/10* (2013.01); *B23B 37/00* (2013.01);
(Continued)

(58) Field of Classification Search
CPC ......... B23B 31/10; B23B 31/02; B23B 37/00; B23B 2260/1285; B23B 2270/10;
(Continued)

(56) References Cited

U.S. PATENT DOCUMENTS 4,308,751 A    1/1982   Thurner et al.
4,761,101 A    8/1988   Zettl
(Continued)

FOREIGN PATENT DOCUMENTS

CN    103223507 A    7/2013
CN    103683536 A    3/2014
(Continued)

OTHER PUBLICATIONS

International Search Report for related PCT application No. PCT/EP2016/066330 dated Oct. 18, 2016, (4 pages).
(Continued)

*Primary Examiner* — Benjamin R Schmitt
(74) *Attorney, Agent, or Firm* — Procopio, Cory, Hargreaves & Savitch LLP

(57) ABSTRACT

The present invention relates to a device for generating an ultrasonic vibration of a tool used for the ultrasonic machining of a workpiece and for measuring ultrasonic vibration parameters of the ultrasonic vibration of the tool having a tool holder for receiving the tool, an ultrasonic transducer in the tool holder for generating the ultrasonic vibration of the tool, a sensor mechanism in the tool holder for producing a sensor signal on the basis of the ultrasonic vibration of the tool, and a sensor signal evaluation device for evaluating the sensor signal.

16 Claims, 7 Drawing Sheets

(51) Int. Cl.
*B24B 1/04* (2006.01)
*B23B 31/02* (2006.01)
*B23B 31/10* (2006.01)

(52) U.S. Cl.
CPC .......... *B24B 1/04* (2013.01); *B23B 2260/108* (2013.01); *B23B 2260/128* (2013.01); *B23B 2260/1285* (2013.01); *B23B 2270/10* (2013.01); *B23C 2270/10* (2013.01)

(58) Field of Classification Search
CPC ........ B23B 2260/108; B23B 2260/128; B24B 1/04; B23C 2270/10; G01H 1/003; G01H 11/00; G01H 11/06; G01H 11/08; G01H 13/00
USPC ....... 73/1.82, 1.84, 471, 584, 632, 645, 649, 73/662, 663
See application file for complete search history.

(56) References Cited

U.S. PATENT DOCUMENTS

| | | | |
|---|---|---|---|
| 5,791,836 A | 8/1998 | Feufel et al. | |
| 8,044,822 B2 | 10/2011 | Hoerl et al. | |
| 8,240,396 B2 | 8/2012 | Sauer et al. | |
| 8,926,235 B2 | 1/2015 | Moraru et al. | |
| 2005/0210986 A1* | 9/2005 | Dondi | B24B 49/10 |
| | | | 73/649 |
| 2008/0041604 A1 | 2/2008 | Sauer | |
| 2008/0180279 A1 | 7/2008 | Hoerl | |
| 2014/0083623 A1 | 3/2014 | Jurzitza | |
| 2015/0352713 A1 | 12/2015 | Shuhei et al. | |

FOREIGN PATENT DOCUMENTS

| | | |
|---|---|---|
| DE | 202006020526 U1 | 11/2008 |
| DE | 202006020526 U1 | 12/2008 |
| DE | 102011076712 A1 | 12/2012 |
| EP | 0 229 399 A2 | 7/1987 |
| EP | 029399 A2 | 7/1987 |
| EP | 0719199 B1 | 10/1997 |
| EP | 1763416 B1 | 3/2007 |
| EP | 1763416 B1 | 5/2008 |
| JP | S62-229397 A | 10/1987 |
| JP | 2009-231803 A | 10/2009 |
| JP | 5308599 B1 | 10/2013 |
| WO | 2014111973 A1 | 7/2014 |

OTHER PUBLICATIONS

German Office Action dated Mar. 7, 2016, for corresponding German Patent Application No. 102015212810.5, (German and Partial English Translation), 6 pages.

Office Action for related Indian Patent Application No. 2018-17004751 dated Jul. 28, 2020 (6 pages).

* cited by examiner

DEVICE FOR GENERATING AN ULTRASONIC VIBRATION OF A TOOL AND FOR MEASURING VIBRATION PARAMETERS

CROSS-REFERENCE TO RELATED APPLICATIONS

This application is a U.S. National Stage entry of PCT Application No. PCT/EP2016/066330, filed on Jul. 8, 2016, which claims priority to a related German Patent Application number 10 2015 212810.5, filed on Jul. 8, 2015, the contents of which are incorporated herein by reference.

TECHNICAL FIELD

The present invention relates to a device for generating an ultrasonic vibration of a tool for the ultrasonic machining of a workpiece and for measuring ultrasonic vibration parameters of the ultrasonic vibration of the tool with a tool holder for receiving the tool and an ultrasonic transducer in the tool holder for generating the ultrasonic vibration of the tool and a method for measuring ultrasonic vibration parameters of a tool for the ultrasonic machining of a workpiece.

BACKGROUND OF THE INVENTION

The prior art discloses machine tools for machining workpieces, which have a signal processing unit and transmitter and receiver diodes in the tool holder, by means of which signals can be transmitted to a transmitting and receiving station.

EP 0 229 399 A2 describes in this connection a chuck having a number of transmitter diodes and receiver diodes, arranged in a radial plane at peripheral distances, and a signal processing unit which is installed in the chuck and has an amplifier member. A stationary transmitting and receiving station is arranged in said radial plane. A sensor installed in the chuck detects the respective operating states which are processed by the signal processing unit, retrieved by the transmitting and receiving station and transmitted via the transmitter diodes of the chuck to the combined transmitting and receiving station.

DE 20 2006 020 526 U1 describes a rotary transmitter with a stator part and a rotor part, each having a stator-side core section and a rotor-side core section, which are separated from one another at mutually facing ends by an air gap, each having at least one power winding wound on the stator-side core section and rotor-side core section for the power transmission in accordance with the transformer principle, and having stator-side and rotor-side coupling turns which are associated with one another in pairs and serve for the inductive data transmission, said coupling turns being connected to a sending and/or receiving electronic unit, wherein the stator part is arranged in a housing which is composed of a basic housing which serves to receive a transmitting and receiving electronic unit with connection cable as well as an interchangeable housing which is detachably arranged on the basic housing and serves to receive the power winding and the at least one coupling turn, and wherein detachable plug contacts for producing electrical connections are arranged between the basic housing and the interchangeable housing.

The prior art also discloses tool heads which render possible an inductive power transmission for a power consumer in the tool head.

EP 0 719 199 B1 describes in this connection a tool head for use in machine tools, comprising a base body, a tool shaft which protrudes axially beyond the base body and which can be coupled to a machine spindle rotating in a machine-side stator, comprising at least one power consumer which is designed to be an adjusting motor for a slider arranged in the base body and/or a measuring electronic unit and comprising an external power supply device for the power consumer, wherein the power supply device has an inductive power transmission path with a primary coil arranged in a machine-side coil housing and a secondary coil arranged in a coil housing which is disposed on the side of the tool head and annularly encompasses the tool shaft and wherein the two coil housings are separated from one another by an air gap when the tool shaft is coupled to the machine spindle.

Furthermore, machine tools are known where, when a workpiece is machined by means of a tool, the rotary motion of the tool can be superimposed by an ultrasonic vibration of the tool.

In this connection, EP 1 763 416 B1 describes a tool having a tool holder, which has a tool holder support for adaptation to a rotary spindle nose at a first end and has a tool support at a second end opposite to the first end, and having a tool head which can be inserted in the tool support, wherein the tool holder comprises a vibration motor.

In such a machine tool, an ultrasonic transducer in the tool holder, which produces the ultrasonic vibration of the tool, a vibrating body and the tool inserted in the tool holder form a vibratory system which is stimulated by an electrical signal to produce mechanical vibrations, wherein the largest possible mechanical vibration amplitude is obtained when the vibratory system is stimulated with its resonance frequency.

This causes the problem that the resonance frequency can change in the course of a processing operation. This has essentially three reasons. On the one hand, the vibratory system or parts thereof can heat up during processing. This changes the properties of the material and leads to a temperature drift of the resonance frequency.

On the other hand, the vibration is damped due to the contact of the tool with the workpiece to be processed, wherein in the case of a damped vibration the resonance frequency of the system is lower than the free resonance frequency of the system.

Furthermore, a new, coupled vibration system is formed by coupling the vibration system to the workpiece, and the resonance frequency of this vibration system is usually higher than the free resonance frequency. These three effects occur in practice in combination, wherein it depends on the specific processing situation which effect dominates.

It should also be noted that in addition to the shift of the resonance frequency, a change in the power also plays a part since due to the interaction of the tool with the workpiece a higher output voltage may be necessary to achieve the same power.

If the free resonance frequency is used for the stimulation, but the actual resonance frequency of the system differs therefrom during processing, the vibration of the tool has a smaller amplitude, and therefore the processing operation becomes less efficient.

For this reason, it is important to detect a change in the resonance frequency of the vibratory system to be able to adapt the vibration parameters correspondingly so as to achieve the highest possible vibration amplitude again.

It is known from ultrasonic welding applications to determine for this purpose both the free resonance frequency and a change in the resonance frequency of the system on the basis of initial values of the generator which supplies the electrical signal for the mechanical vibration to the piezo drive in the tool holder. The generator sees or tells from the vibratory system connected via an inductive transmission path an electrical impedance which is frequency-dependent and which has a minimum at the mechanical resonance frequency. Correspondingly, the generator readjusts, in the case of a shift of the resonance frequency, its frequency until it reaches the impedance minimum again. In addition to the frequency of the impedance minimum, the impedance value also changes as a result of the processing operation, i.e. a higher output voltage is necessary to drive the same power.

However, this method is not suitable for a machining operation because, unlike ultrasonic welding, the impedance curves of the utilized sonotrodes with inserted tools are much more complex: On the one hand, there are significantly more impedance minimums due to the many different vibration modes of the tools which have complex forms. On the other hand, the influencing variables which effect a shift of the resonance frequency have a more extreme effect, i.e. the frequency shift can be so large that further impedance minimums are skipped. A sonotrode exerts almost the same pressure on the workpiece during the entire welding process. This results in a single frequency shift which is the same in recurring processes and in which the impedance minimum can always be clearly identified. In contrast, the frequency shift constantly changes during machining on account of varying engaging conditions of the tool into the material and, as described above, the assignment is often no longer possible by means of an impedance measurement alone.

This is because a great many tools with different forms are used, e.g. drills and milling cutters having different dimensions and cutting tools having different cutting edge geometries, which leads to a higher variance in the shape of the impedance curve as compared to ultrasonic welding. Furthermore, the force acting on the vibratory system is generally significantly higher in a machining operation, and therefore the change in the impedance curve is much more marked.

In addition, on account of the recurring processing steps during welding the dominating frequency shift effect can be well predicted, which limits the possible reactions of the system. In contrast, all effects have to be taken into consideration in a machining operation, and for this reason the prediction possibilities and/or the possibilities for limiting the adjustment parameters are insufficient.

Moreover, it is not possible to distinguish bending vibrations or the like from axial vibration modes on the basis of the impedance measurement alone. Also, there are purely electrical resonances which do not produce any vibrations at all. These parasitic effects cannot be detected by the known methods.

SUMMARY OF THE INVENTION

An object of the present invention is therefore to provide a device for generating an ultrasonic vibration of a tool for the ultrasonic machining of a workpiece and for measuring ultrasonic vibration parameters of the ultrasonic vibration of the tool, by means of which the above problems are avoided.

In particular, an object of the present invention is to provide a device by means of which a higher processing accuracy can be achieved in the ultrasonic machining of a workpiece.

Furthermore, an object of the present invention is to provide a method, by means of which the processing accuracy in the ultrasonic machining of a workpiece can be increased.

These objects are achieved by a device according to claim 1 and a method according to claim 15. The dependent claims relate to advantageous embodiments of the device according to the invention and the method according to the invention, respectively.

The device according to the invention for generating an ultrasonic vibration of a tool for the ultrasonic machining of a workpiece and for measuring ultrasonic vibration parameters of the ultrasonic vibration of the tool comprises: a tool holder for accommodating the tool, an ultrasonic transducer in the tool holder for generating the ultrasonic vibration of the tool, a sensor mechanism in the tool holder for producing a sensor signal on the basis of the ultrasonic vibration of the tool, and a sensor signal evaluation device for evaluating the sensor signal.

For example, the ultrasonic transducer can be made in the form of one or several piezo elements which also act as a sensor mechanism. Here, the stimulation signal for the piezo elements is interrupted for a short time and the fading vibration of the piezo elements is detected as a voltage signal. For the purpose of stimulation and vibration measurement, the same transmission path or different transmission paths can be used by a corresponding wiring on the machine side, wherein if only one transmission path is used, it can be coupled to the generator for the purpose of vibration stimulation and can be coupled to an electronic unit for the purpose of vibration measurement.

Alternatively, the ultrasonic transducer and sensor mechanism can be designed as device elements that are different from one another, wherein it is also possible to use different transmission paths for the vibration stimulation and for the vibration measurement. The sensor mechanism can be designed e.g. as a piezoelectric sensor. The sensor mechanism can also be designed as a strain gage with an electronic circuit in the tool holder for producing the sensor signal.

Therefore, a device is provided by means of which an ultrasonic vibration of the tool can be produced and a direct measurement of the ultrasonic vibration parameters of the vibrating tool can be carried out at the same time. It is thus possible to produce an electric sensor signal which permits to draw a direct conclusion to the mechanical vibration. The sensor signal can be produced during processing at one or more points in time or over a time period and can thus be updated at any time. Due to this it is possible to monitor the vibration and/or detect changes in the vibration parameters, such as a reduction in the vibration amplitude or a change in the resonance frequency.

The sensor mechanism is preferably designed as a piezoelectric sensor element and the sensor signal is an electric voltage caused by the ultrasonic vibration of the tool.

The advantage is that in order to produce and transmit the sensor signal in the tool holder, no additional circuit has to be provided in the tool holder.

The tool holder can preferably be rotated and the device has a transmitter element connected to the sensor mechanism in the tool holder and a receiver element spaced apart from the transmitter element for the contactless transmission of the sensor signal from the transmitter element to the receiver element.

In this connection, the receiver element can be arranged e.g. outside the tool holder in a stationary part of a machine tool with the device according to the invention. By means of the machine-side receiver element spaced apart from the transmitter element, the sensor signal can be led out of the rotatable tool holder for the purpose of evaluation.

The sensor mechanism preferably has a one-piece element made of piezoelectric material and has a plurality of electrode segments for the detection of ultrasonic vibration portions in an axial direction of the tool and of bending vibration portions of the ultrasonic vibration of the tool.

For example, the sensor mechanism can be designed as a piezo element platelet, which is provided with electrodes on two sides which are opposite each other. The segmentation of the electrodes has the advantage that not only axial (along the tool axis) vibration components of the tool but also bending or tilting vibration portions can be detected, which can occur in the case of a lateral load of the tool. The advantage is that the sensor signal contains more precise information on the mechanical vibration.

The sensor mechanism preferably has an insulating element for the electric insulation of the ultrasonic transducer and the device has a power transmission device for transmitting power into the tool holder for providing the ultrasonic transducer with power, wherein the power transmission device is electrically insulated from the transmitter element and from the receiver element.

Due to the electric decoupling of the sensor mechanism and the sensor signal path in the tool holder from the ultrasonic vibration drive and the power supply thereof, the tool vibration is detected fully independently of the tool vibration generation, which prevents a falsification of the sensor signal.

With respect to the ultrasonic transducer, the sensor mechanism is preferably arranged in the tool holder in such a way that the ultrasonic vibration of the tool is produced by the ultrasonic transducer and the ultrasonic vibration of the tool is detected by the sensor mechanism in substantially the same direction.

The advantage is that natural frequency modes of the vibratory system, which are not consistent with the ultrasonic vibration of the tool that is advantageous for the processing operation, such as a bending vibration of the tool, are not measured but only the relevant vibration forms are detected by the sensor element. The sensor element and the ultrasonic transducer can be arranged successively e.g. in the tool holder along the tool axis to produce and/or detect an axial vibration.

The ultrasonic transducer preferably has a layer-like structure comprising a plurality of first piezo elements and the sensor mechanism has a layer-like structure comprising a second piezo element and a plurality of insulating elements, wherein the ultrasonic transducer and the sensor mechanism are coupled mechanically together.

In this connection, it is advantageous for the second piezo element to be arranged on an end of the ultrasonic transducer since the vibration amplitude to be measured is at a maximum there. For example, six first piezo elements and the piezoelectric sensor element can be arranged successively along the tool axis. Thus, the ultrasonic transducer and the sensor element can be accommodated in the tool holder in a space-saving way. As a result doubling the number of first piezo elements, twice the force can be applied to the tool. In other words, three times the force can be transmitted to the tool with six first piezo elements as compared to two first piezo elements.

A plurality of transmitter elements connected to the sensor mechanism is preferably arranged along the circumference on the tool holder.

For example, four transmitter elements can be arranged along the circumference of the tool holder at a distance of 90° each. The advantage is that signal losses are kept at a minimum when the sensor signal is transmitted from the tool holder into the machine-side part, in particular when the tool holder rotates.

The transmitter element and the receiver element are preferably configured to transmit the sensor signal inductively from the transmitter element to the receiver element.

This form of contactless transmission has the advantage that it is not necessary to provide an additional circuit or power supply in the tool holder or a power adapter to lead the sensor signal out of the tool holder since the inductive transmission does not require any further power.

The transmitter element and the receiver element preferably form a first transformer, wherein the transmitter element has a first ferrite core and a primary winding of the first transformer and the receiver element has a second ferrite core and a secondary winding of the first transformer, and the power transmission device is made as a second transformer with a primary winding of the second transformer and a secondary winding of the second transformer, wherein the first transformer and the second transformer are arranged in such a way that the sensor signal is transmitted from the primary winding of the first transformer to the secondary winding of the first transformer in a substantially perpendicular direction in relation to a transmission direction of the power for the power supply of the ultrasonic transducer from the primary winding of the second transformer to the secondary winding of the second transformer.

The advantage is that the respective magnetic fields of the two transformers are aligned perpendicularly in relation to each other such that the power supply and the signal transmission only influence each other to a minor extent.

Alternatively, the transmitter element and the receiver element are configured to transmit the sensor signal optically from the transmitter element to the receiver element.

The transmitter element is preferably arranged in a bore on the external side of the tool holder.

Therefore, a bore which is already available in the tool holder, e.g. for receiving a chip to store data, can additionally serve to receive the transmitter element.

The device preferably has a compensation circuit for compensating a reactive power flowing between a generator and the tool holder.

The compensation circuit can be designed as a parallel circuit, series circuit or combination circuit from one or more capacitances and/or one or more inductances. For example, the compensation circuit can be designed as a capacitance switched parallel to the second transformer. The advantage is that the heating of the system by the reactive power can be reduced. The device can additionally have a relay for adapting the compensation of the reactive power flowing between the generator and the tool holder. The advantage is that the values of the capacitances and/or the inductances of the compensation circuit can easily be changed in this way.

A machine tool according to the invention for machining a workpiece comprises the device according to the invention and a housing which accommodates both a stationary part of the power transmission apparatus which includes the primary winding of the second transformer and a first pot core of the second transformer as well as the receiver element.

Thus, the sensor signal can be passed into the stationary part of the machine tool where it is evaluated.

The method according to the invention for measuring ultrasonic vibration parameters of a workpiece for the ultrasonic machining of a workpiece comprises the steps of: setting the tool received in a tool holder in ultrasonic vibration; producing a sensor signal on the basis of the ultrasonic vibration of the tool by means of a sensor mechanism in the tool holder; sending the sensor signal from the sensor mechanism to a transmitter element, which is connected to the sensor mechanism, in the tool holder; transmitting the sensor signal from the transmitter element to a receiver element spaced apart from the transmitter element; sending the sensor signal from the receiver element to a sensor signal evaluation device; evaluating the sensor signal in the sensor signal evaluation device for determining the ultrasonic vibration parameter of the tool.

Therefore, an electric sensor signal is produced that permits to draw a direct conclusion to the mechanical vibration. The sensor signal can be produced during processing at one or more points in time or over a time period. Therefore, the ultrasonic vibration parameters can constantly be updated, and changes in the vibration can be detected continuously.

The sensor signal is preferably an electric voltage caused by the ultrasonic vibration of the tool.

The advantage is that the mechanical vibration parameters can easily be determined from such a sensor signal.

When the sensor signal is evaluated, a frequency of the ultrasonic vibration of the tool is preferably determined from a frequency of the sensor signal and/or an amplitude of the ultrasonic vibration of the tool is preferably determined from an amplitude of the sensor signal.

Therefore, resonance frequency changes in the vibratory system and/or a reduction in the amplitude can easily be determined from the sensor signal. Thus, the vibration system can be adjusted in resonance on the basis of the comparison of the radiated frequency and the current resonance frequency if this is advantageous for the processing operation.

DETAILED DESCRIPTION OF THE DRAWINGS AND PREFERRED EMBODIMENTS OF THE PRESENT INVENTION

The present invention is described and explained in detail below by means of embodiments and the exemplary drawings.

Figure 1:
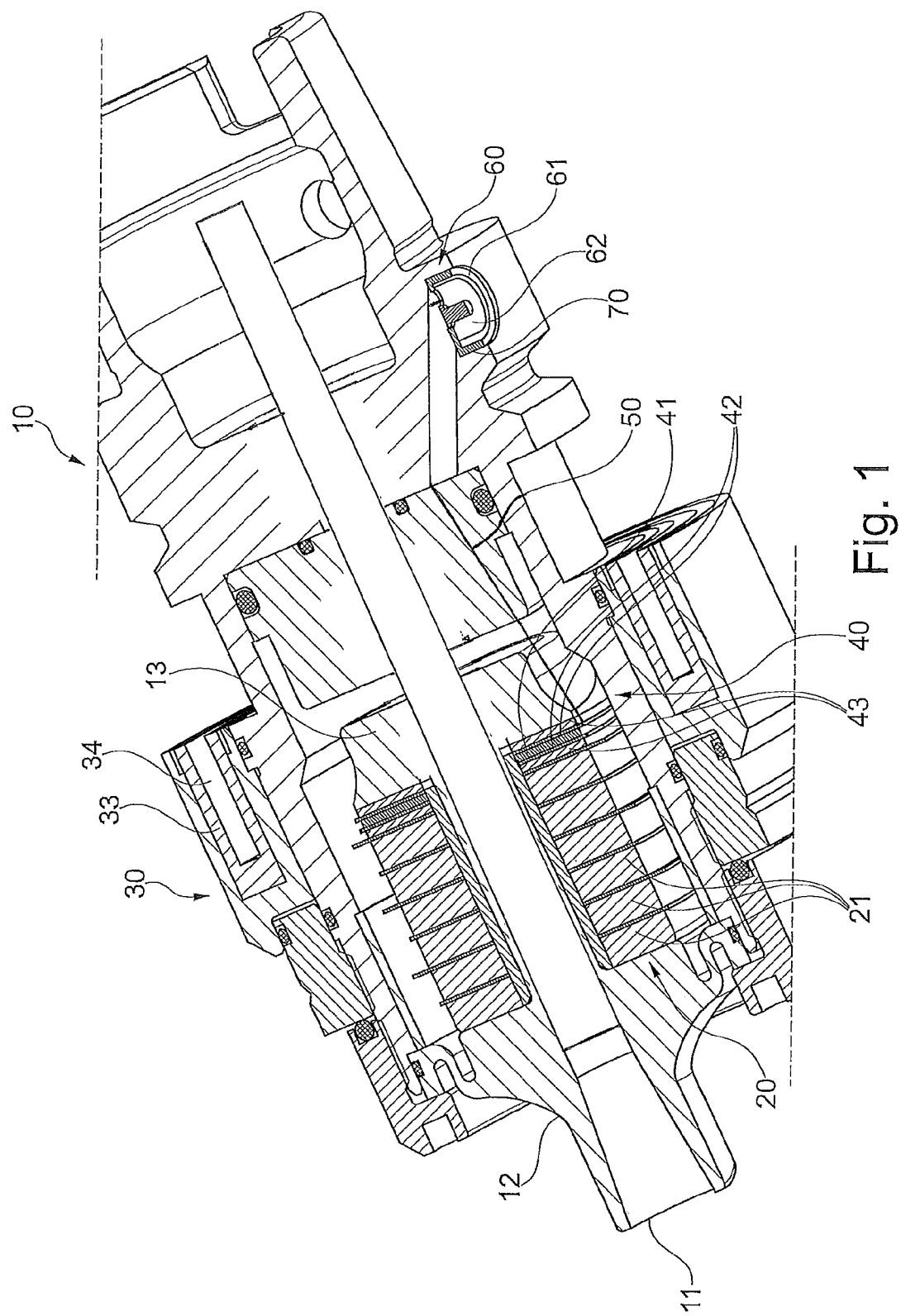
FIG. 1 shows a sectional view of a tool holder of an embodiment of a device according to the invention.

FIG. 1 shows a tool holder 10 of a device according to the invention. A tool support portion 11 for receiving a tool 90 (not shown) is disposed on one end of the tool holder 10. A plurality, e.g. six, perforated disk-shaped first piezo elements 21 are arranged in stacked fashion in the tool holder 10. Said piezo elements are connected to the tool support portion 11 via a transmission portion 12 and form an ultrasonic transducer 20 for converting an electric voltage into a mechanical vibration. The mechanical vibration of the first piezo elements 21 is transmitted to the tool 90 via the transmission portion 12. The first piezo elements 21 can be designed e.g. as piezo ceramic disks with electrodes mounted between them. The power is supplied to the ultrasonic transducer 20 via a transformer (second transformer) which, on the machine side, consists of a first pot core 31 and a primary winding 32 (not shown) and, on the tool side, of a second pot core 33 and a secondary coil 34, which are arranged as ring elements on the external side of the tool holder 10.

On a side of the stack that faces away from the tool support portion 11 and is made of first piezo elements 21, a perforated disk-shaped piezoelectric sensor element is arranged as a sensor mechanism 40, which is mechanically coupled to the first piezo elements 21 but is electrically insulated from the first piezo elements 21 by an insulating element 43, which can consist of a ceramic perforated disk. The piezoelectric sensor element 40 is electrically insulated from an attachment element 13, e.g. an attachment nut, by a further insulating element 43. The attachment element 13 serves to attach the piezoelectric sensor element 40 on the ultrasonic transducer 20 and the preload of the first piezo elements 21 since they are dynamically loaded. The design of the piezoelectric sensor element 40 is described in more detail below by means of FIG. 3. The first piezo elements 21 and the piezoelectric sensor element 40 have the same orientation, so that, on the one hand, the generation and the detection of the vibration in the same direction are made possible and, on the other hand, a space-saving arrangement of the elements is achieved in the tool holder 10. The piezoelectric sensor element 40 changes the mechanical vibrations of the vibratory system, which consists of the tool 90, the transmission portion 12, the ultrasonic transducer 20 and the piezoelectric sensor element 40, into a sensor signal which is transmitted as an electric voltage via a wire connection 50 from the piezoelectric sensor element 40 through the tool holder 10 to a transmitter element 60 on the external side of the tool holder 10. The sensor signal is transmitted in contactless fashion from the transmitter element 60 to a machine-side receiver element 80 (not shown). The transmitter element 60 is part of a further transformer (first transformer) and consists of a first ferrite core 61 and a primary winding 62; the receiver element 80 is also part of the first transformer and consists of a second ferrite core 81 and a secondary winding 82. Thus, the sensor signal can inductively be transmitted from the tool holder 10 to a machine-side sensor signal evaluation device 110 (not shown). Alternatively, an optic transmission is also possible, wherein the transmitter element 60 is designed as an LED and the receiver element 80 as a photodiode. The transmitter element 60 can be dimensioned and positioned in such a way that it fits into a bore 70 for a data chip for tool data according to the DIN 69893 standard. The arrangements of the power transmission device 30 and the signal transmission device consisting of transmitter element 60 and receiver element 80 are explained in more detail below by means of FIG. 6. The tool holder 10 can be rotatable in relation to a stationary part of the machine tool (not shown).

Figure 2:
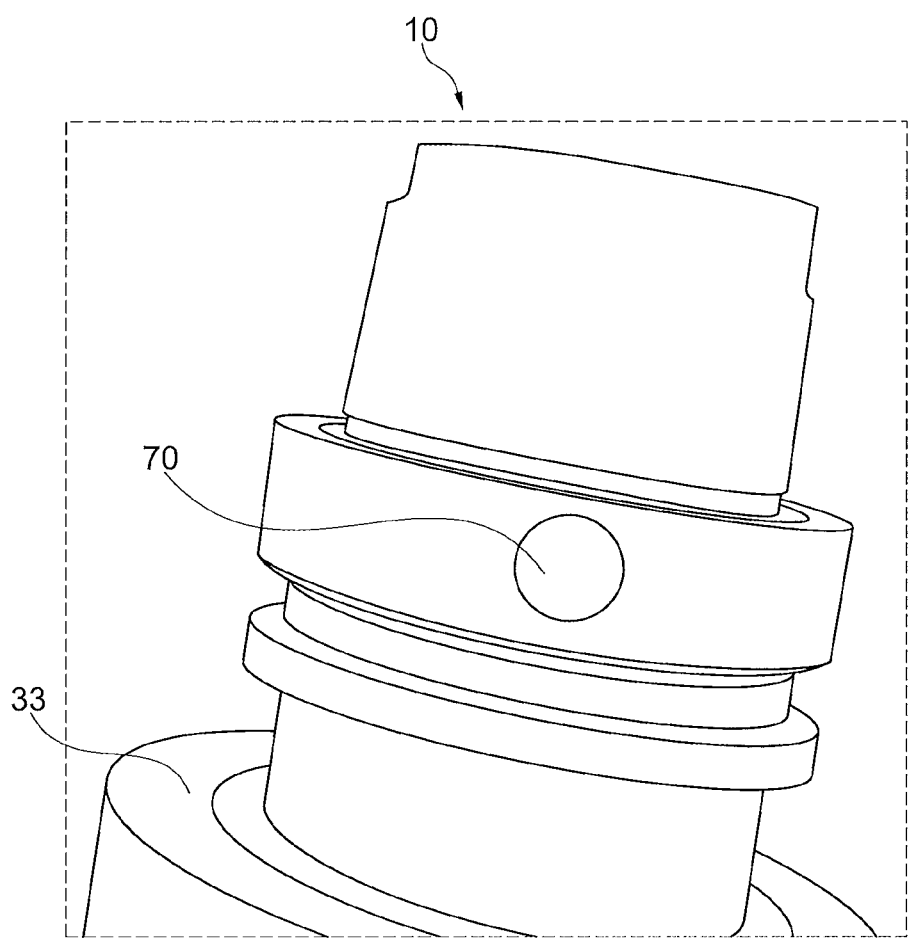
FIG. 2 shows a tool holder of an embodiment of the device according to the invention.

In FIG. 2, the tool holder 10 is shown from the side. The bore 70, in which the transmitter element 60 is arranged, is disposed on the external side of the tool holder 10. In the bottom of the figure, the pot core 33 (second pot core) of the power transmission device 30 is shown which supplies the ultrasonic transducer 20 in the tool holder 10 with power. In this representation, the tool 90 (not shown) can be received facing downwards in the tool support portion 11 (not shown).

Figure 3:
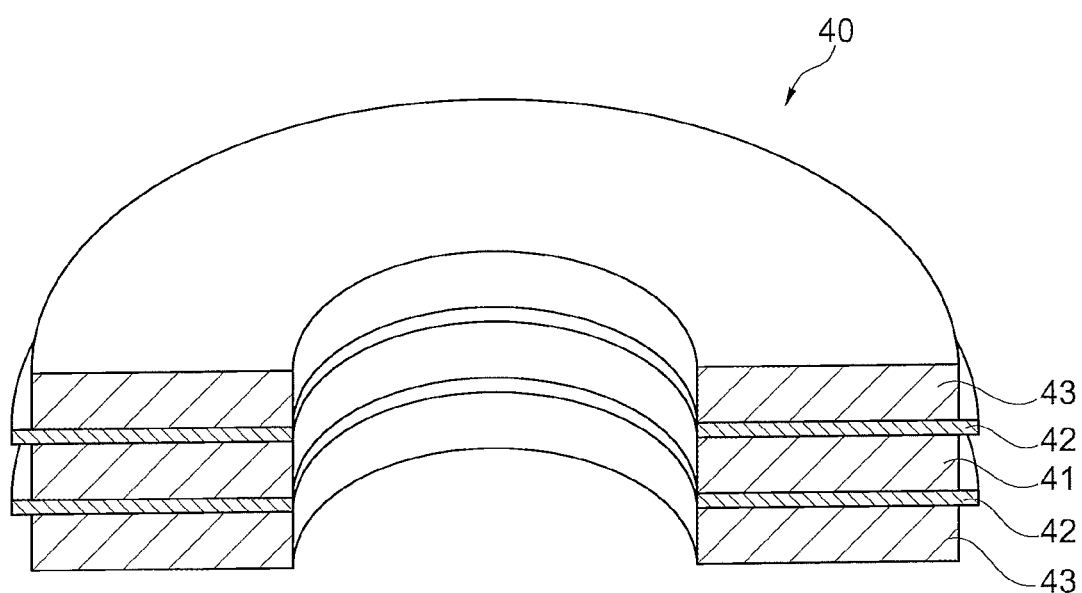
FIG. 3 shows a sectional view of a piezoelectric sensor element of an embodiment of a device according to the invention.

FIG. 3 shows in a sectional view the design of the piezoelectric sensor element 40. The piezoelectric sensor element 40 consists of a one-piece element made of piezoelectric material 41, such as a piezoelectric ceramic material, which has the shape of a circular disk with a circular central hole. Electrodes 42 are mounted on the two sides of the one-piece element 41, such that an electric voltage is produced on the electrodes 42 by the electric field which is caused by the mechanical vibration. The electrodes 42 can either be made in one piece as circular disks having a circular central hole analogous to the one-piece element made from piezoelectric material 41 but less thick in relation to this element (see FIG. 4A) or as disk segments 42a, e.g. disk quarters (see FIG. 4B). Axial vibration components of the vibratory system can be detected along the tool axis by means of a one-piece electrode disk 42; electrode segments 42a have the advantage that it is thus possible to detect vibration portions of the system in two axes. This is explained in more detail below by means of FIGS. 5A and 5B. In addition, torsional vibrations of the tool 90 can also be detected by a plurality of electrode segments 42a and a suitably polarized piezo ceramic material as one-piece element 41. One insulating element 43 each, which can also be made as a circular disk having a central hole and can consist of a ceramic material, borders on the respectively other electrode surface, which does not border on the one-piece element made from piezoelectric material 41. The piezoelectric sensor element 40 is electrically insulated from the adjacent ultrasonic transducer 20 and from other parts of the tool holder 10, in particular from the attachment element 13, by the insulating elements 43, such that the sensor signal produced by the piezoelectric sensor element 40 is not disturbed and is only transmitted via the wire connection 50.

Figure 4A:
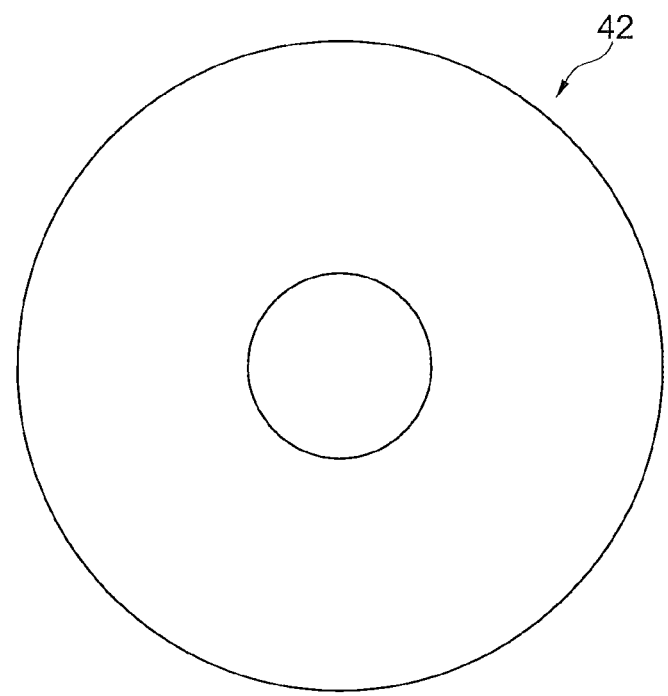
FIG. 4A shows an electrode of an embodiment of a device according to the invention.
Figure 4B:
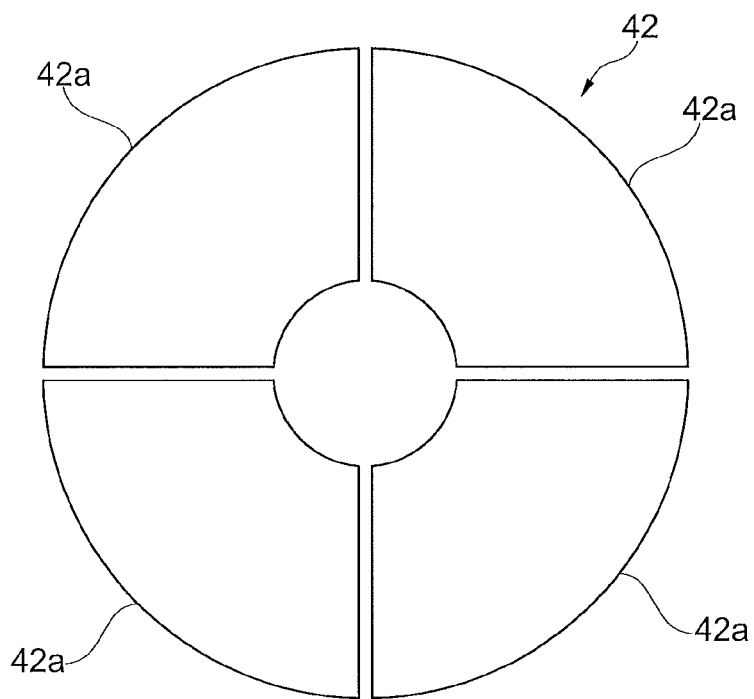
FIG. 4B shows an electrode of a further embodiment of a device according to the invention.
Figure 5B:
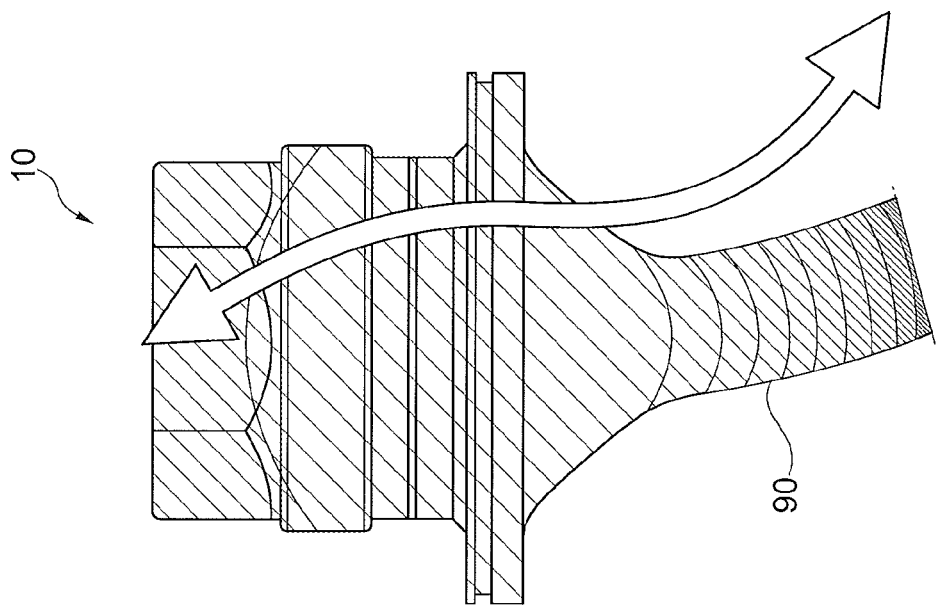
FIG. 5B shows an embodiment of the device according to the invention during processing.
Figure 5A:
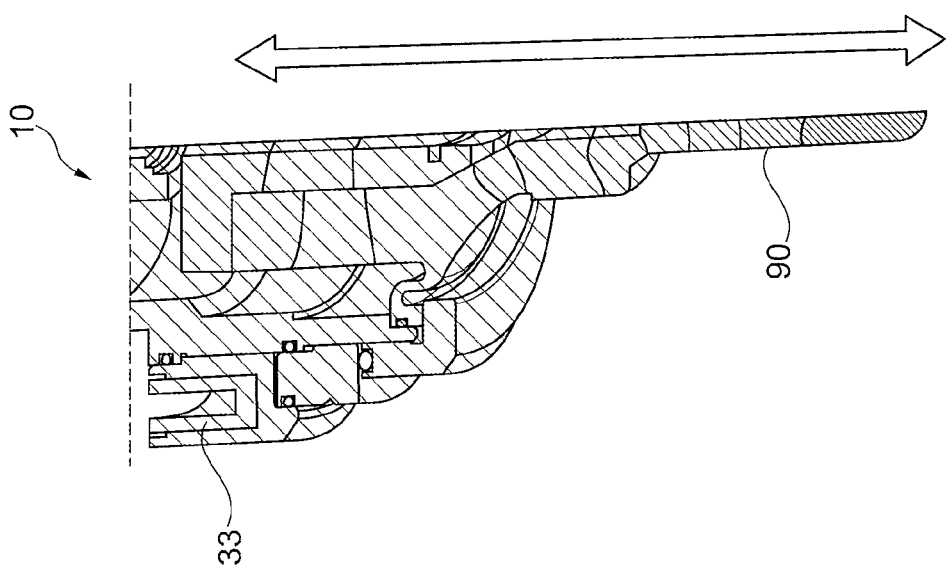
FIG. 5A shows an embodiment of the device according to the invention during processing.

FIGS. 5A and 5B show various vibration shapes of the vibratory system. In FIG. 5A, the tool 90 in the tool holder 10 vibrates in an axial direction, i.e. in a direction along the tool axis, up and down, as outlined by the perpendicular arrow. FIG. 5B also shows an axial vibration of the tool 90, which is, however, superimposed by a vibration in a direction perpendicular thereto. Such a superimposed vibration can be triggered e.g. by a lateral compressive load of the tool during machining which bends the tool 90. One-piece electrodes 42, as shown in FIG. 4A, are sufficient to detect the vibration portions in an axial direction. If the bending vibration portions in other directions shall also be detected, segmented electrodes 42a, as shown in FIG. 4B, are necessary since in that case the electrode segments 42a can vibrate in different ways on the surface of the one-piece element made from piezoelectric material 41.

Figure 6:
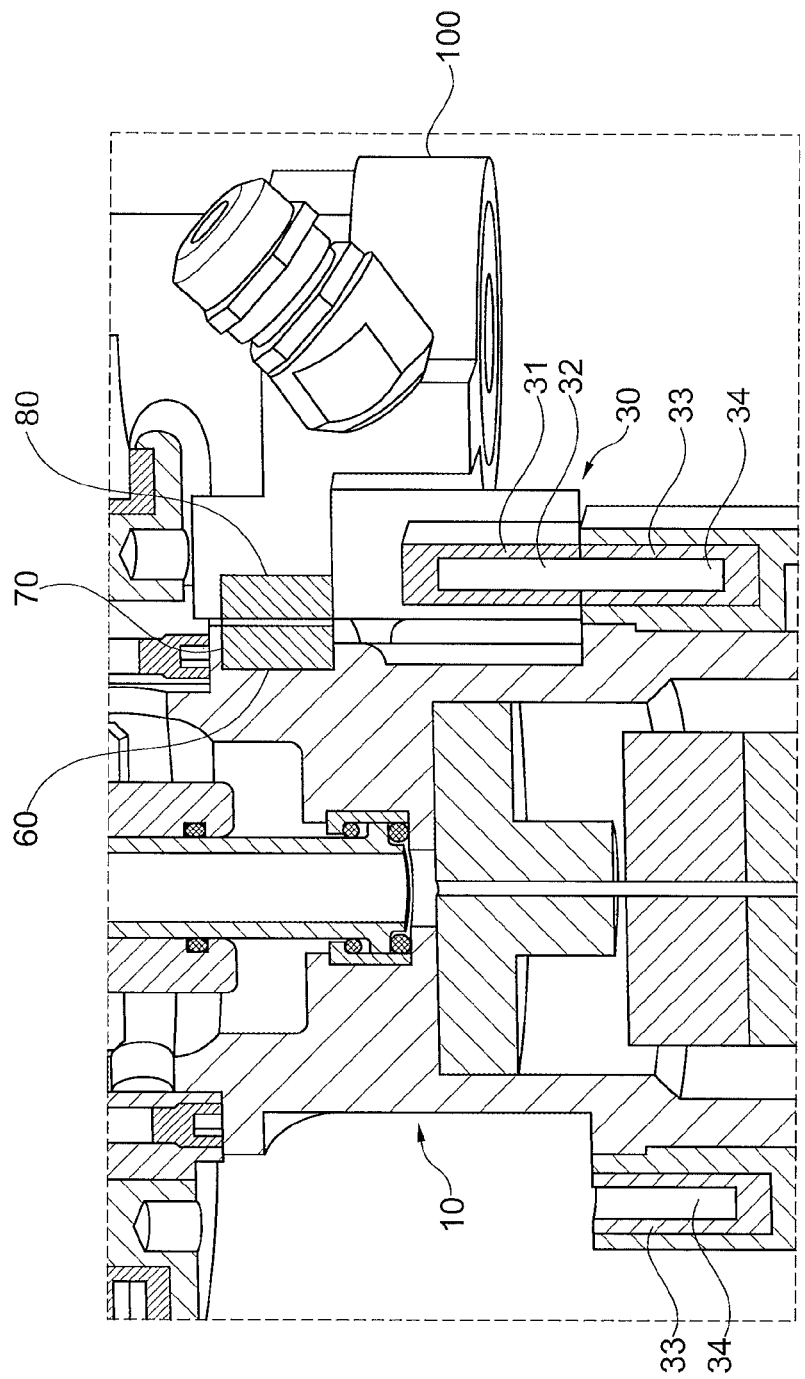
FIG. 6 shows part of a machine tool according to the invention with an embodiment of the device according to the invention.

FIG. 6 shows, as a sectional view, the arrangement of the power transmission device 30 for transmitting the power for the ultrasonic transducer 20 into the tool holder 10 and the arrangement of the transmitter element 60 and of the receiver element 80 for transmitting the sensor signal out of the tool holder 10.

The power transmission device 30 is designed as a transformer (second transformer) with a first pot core 31, a primary winding 32, a second pot core 33 and a secondary winding 34, wherein the openings of the pot cores 31, 33 face each other and the windings 32, 34 are arranged in the respective pot cores 31, 33. The second pot core 33 is here arranged annularly on the tool holder periphery; the first pot core 31 is positioned in an axial direction in relation to the second pot core in spaced-apart fashion in a machine-side housing 100 and is arranged as either a ring segment or as a frill ring around the tool holder 10. The power is thus inductively transmitted in FIG. 6 in an axial direction from top to bottom from the primary winding 32 to the secondary winding 34.

The receiver element 80 is also located in the housing 100. The transmitter element 60 is arranged opposite the receiver element 80 at a distance in a bore 70 on the tool holder 10. The sensor signal is thus transmitted in contactless fashion in a radial direction in FIG. 6 from left to right from the transmitter element 60 to the receiver element 80. It is also possible to arrange a plurality of transmitter elements 60 circumferentially on the tool holder 10 to reduce signal losses when the sensor signal is transmitted during a rotation of the tool holder 10. Likewise, a plurality of receiver elements 80 can be arranged opposite the transmitter element 60 or the transmitter elements 60.

During the rotation of the tool holder 10, the second pot core 33 and the secondary winding 34 of the power transmission device 30 and the transmitter element 60 co-rotate with the tool holder 10 whereas the housing 100 is mounted e.g. on the tool spindle (not shown) by means of the first pot core 31 and the primary winding 32 of the power transmission device 30 as well as the receiver element 80 and does not rotate.

Figure 7:
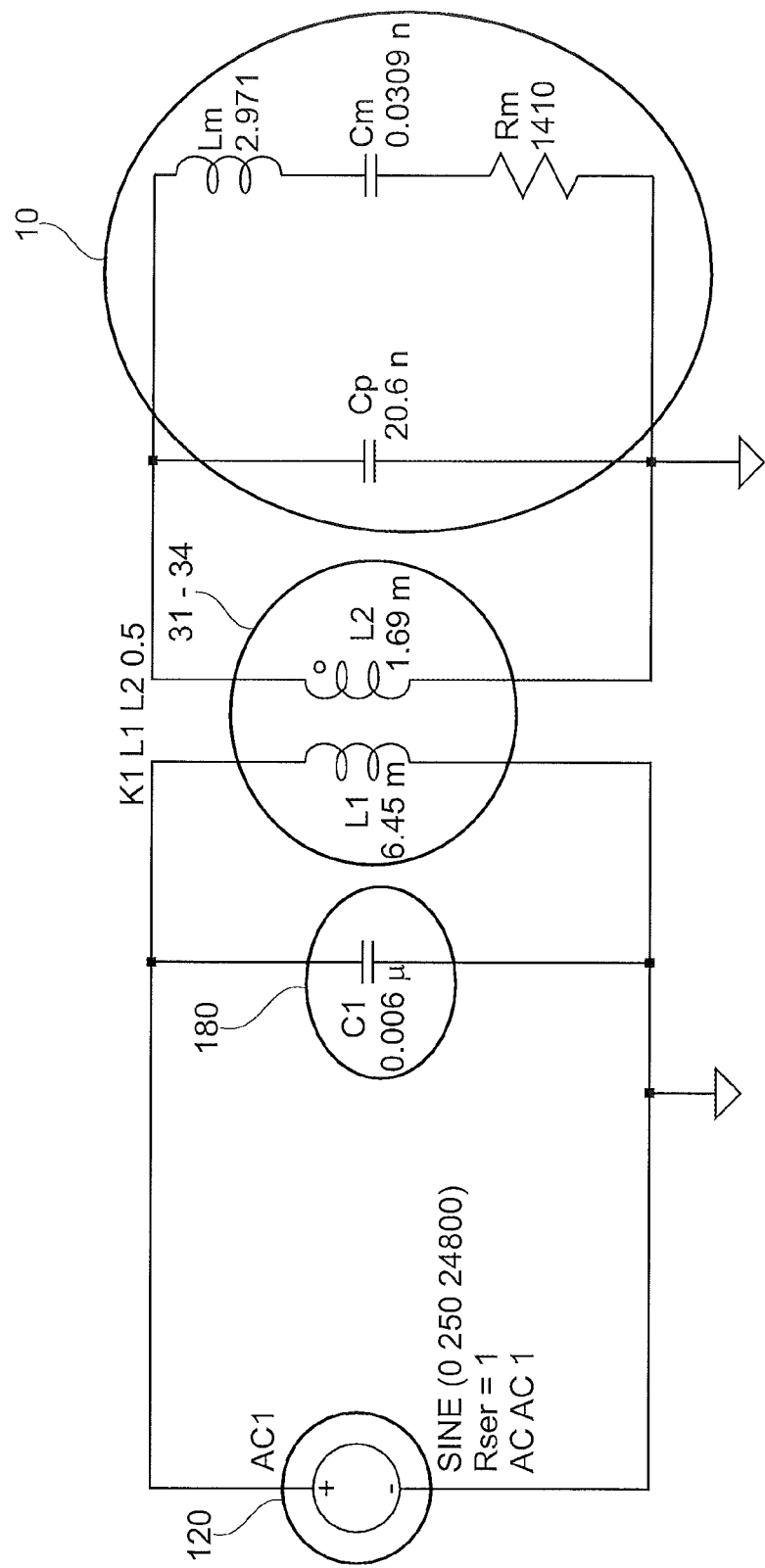
FIG. 7 shows a further embodiment of the device according to the invention.

FIG. 7 shows a wiring diagram of the above described components with an exemplary compensation circuit. This figure shows a replacement wiring diagram of the piezo drive in the tool holder 10, of the second transformer 31-34 with the primary winding 32 on the left and the secondary winding 34 on the right and an ultrasonic generator 120 for the stimulation of the piezo drive. Parallel to the transformer 31-34, a capacitance 180 is switched on the machine side, the value of which can be changed via a relay 190 (not shown).

Depending on the phase shift between voltage and current, reactive power flows in reciprocating fashion between the generator 120 and the tool holder 10 and does not perform any mechanical work but only contributes to heating the system. The reactive power can be compensated for by the capacitance 180. However, since the compensated electrical impedance also has a frequency response, the compensation only functions with a constant value of the capacitance 180 with sufficient accuracy if the changes in the excitation frequency for the piezo drive are small. If the change is large, the value of the capacitance 180 is correspondingly switched by a relay 190.

The compensation circuit can be designed as a parallel circuit, a series circuit or a combination circuit from capacitances and/or inductances and can be switched by a relay 190.

The present invention is not limited to the above described embodiments but the individual aspects and/or individual features of the above described embodiments can rather be combined to provide further embodiments of the present invention.

LIST OF REFERENCE SIGNS

10 tool holder
11 tool support portion
12 transmission portion
13 attachment element
20 ultrasonic transducer
21 first piezo element
30 power transmission device
31 first pot core 32 primary winding of the second transformer
33 second pot core
34 secondary winding of the second transformer
40 piezoelectric sensor element as a sensor mechanism
41 one-piece element made of piezoelectric material
42 electrode
42a electrode segment
43 insulating element
50 wire connection
60 transmitter element
61 first ferrite core
62 primary winding of the first transformer
70 bore
80 receiver element
81 second ferrite core
82 secondary winding of the first transformer
90 tool
100 housing
110 sensor signal evaluation device
180 capacitance
190 relay

The invention claimed is:

1. A device configured to generate an ultrasonic vibration in a tool for ultrasonic machining of a workpiece and for measuring ultrasonic vibration parameters of the ultrasonic vibration of the tool, comprising
a tool holder configured to receive the tool,
an ultrasonic transducer in the tool holder, the ultrasonic transducer configured to generate the ultrasonic vibration in the tool,
a sensor mechanism in the tool holder configured to produce a sensor signal based on the ultrasonic vibration of the tool, and
a sensor signal evaluation device configured to analyze the sensor signal;
wherein
the sensor mechanism comprises a one-piece element made of piezoelectric material and a plurality of electrode segments configured to detect ultrasonic vibration portions in an axial direction of the tool and bending vibration portions of the ultrasonic vibration of the tool.

2. The device according to claim 1, wherein
the sensor mechanism is a piezoelectric sensor element, and
the sensor signal is an electric voltage which is produced by the ultrasonic vibration of the tool.

3. The device according to claim 1, wherein
the tool holder is configured to rotate, and
the device further comprises a transmitter element connected to the sensor mechanism, in the tool holder and a receiver element spaced apart from the transmitter element, for contactless transmission of the sensor signal from the transmitter element to the receiver element.

4. The device according to claim 3, wherein
the sensor mechanism comprises an insulating element configured to provide electrical insulation of the ultrasonic transducer, and
the device further comprises a power transmission device configured to transmit power into the tool holder to supply power to the ultrasonic transducer, wherein the power transmission device is electrically insulated from the transmitter element and from the receiver element.

5. The device according to claim 4, wherein
the ultrasonic transducer comprises a layer-like structure made of several first piezo elements and
the sensor mechanism comprises a layer-like structure made of a second piezo element and a plurality of insulating elements, wherein
the ultrasonic transducer and the sensor mechanism are mechanically coupled to one another.

6. The device according to claim 3, wherein
the transmitter element and the receiver element are configured to transmit the sensor signal inductively from the transmitter element to the receiver element.

7. The device according to claim 3, wherein
the transmitter element forms a first transformer with the receiver element, wherein
the transmitter element comprises a first ferrite core and a primary winding of the first transformer and the receiver element has a second ferrite core and a secondary winding of the first transformer, and
the power transmission device is designed as a second transformer with a primary winding of the second transformer and a secondary winding of the second transformer, wherein
the first transformer and the second transformer are arranged such that the sensor signal is transmitted from the primary winding of the first transformer to the secondary winding of the first transformer in a substantially perpendicular direction in relation to a transmission direction of the power for supplying power to the ultrasonic transducer from the primary winding of the second transformer to the secondary winding of the second transformer.

8. The device according to claim 7, further comprising
a compensation circuit for compensating a reactive power flowing between a generator and the tool holder.

9. The device according to claim 3, wherein
the transmitter element and the receiver element are configured to transmit the sensor signal optically from the transmitter element to the receiver element.

10. The device according to claim 3, wherein
the transmitter element is arranged in a bore on an external side of the tool holder.

11. The device according to claim 3, wherein the device is incorporated in machine tool configured to conduct machining of a workpiece, and wherein the machine tool comprises
a housing, which accommodates both a stationary part of the power transmission device and the receiver element, the stationary part of the power transmission device comprising the primary winding of the second transformer and a first pot core of the second transformer as well as the receiver element.

12. The device according to claim 1, wherein
the sensor mechanism is arranged in the tool holder with respect to the ultrasonic transducer such that the generation of the ultrasonic vibration of the tool by using the ultrasonic transducer and the detection of the ultrasonic vibration of the tool by the sensor mechanism occur substantially in the same direction.

13. The device according to claim 1, wherein
several transmitter elements, which are connected to the sensor mechanism, are arranged along the circumference of the tool holder.

14. A method for measuring ultrasonic vibration parameters of a tool for the ultrasonic machining of a workpiece, the method comprising:
setting a tool received in a tool holder in ultrasonic vibration;

producing a sensor signal on the basis of the ultrasonic vibration of the tool by means of a sensor mechanism in the tool holder;

sending the sensor signal from the sensor mechanism to a transmitter element, which is connected to the sensor mechanism, in the tool holder;

transmitting the sensor signal from the transmitter element to a receiver element, which is spaced apart from the transmitter element;

sending the sensor signal from the receiver element to a sensor signal evaluation device;

evaluating the sensor signal in the sensor signal evaluation device to determine the ultrasonic vibration parameters of the tool;

wherein the sensor mechanism comprises a one-piece element made of piezoelectric material and a plurality of electrode segments configured to detect ultrasonic vibration portions in an axial direction of the tool and bending vibration portions of the ultrasonic vibration of the tool.

15. The method according to claim 14, wherein
the sensor signal is an electric voltage caused by the ultrasonic vibration of the tool.

16. The method according to claim 14, wherein,
during the evaluation of the sensor signal, a frequency of the ultrasonic vibration of the tool is determined from a frequency of the sensor signal and/or an amplitude of the ultrasonic vibration of the tool is determined from an amplitude of the sensor signal.

* * * * *